United States Patent [19]

Burns et al.

[11] Patent Number: 4,910,675
[45] Date of Patent: Mar. 20, 1990

[54] DISKETTE FINISHING UNIT

[75] Inventors: David C. Burns, Long Lake; John S. Lee, Coon Rapids; Robert L. Skubic, Bloomington; Mark C. Albu, Carver; Timothy P. Fitzgerald, Minneapolis; Gerry A. Lee, Prior Lake; David C. Duncan, Brooklyn Park, all of Minn.

[73] Assignee: Rimage Corp., Eden Prairie, Minn.

[21] Appl. No.: 265,396

[22] Filed: Oct. 31, 1988

[51] Int. Cl.⁴ .................. G11B 5/00; G11B 7/00
[52] U.S. Cl. .................................................... 364/478
[58] Field of Search ........................... 364/468, 478; 360/131–133

[56] References Cited

U.S. PATENT DOCUMENTS

| | | | |
|---|---|---|---|
| 3,881,979 | 5/1975 | Kelly | 156/249 |
| 3,894,905 | 7/1975 | Ehlscheid | 156/384 |
| 4,064,674 | 12/1977 | Palmer | 53/23 |
| 4,149,356 | 4/1979 | Palmer | 53/459 |
| 4,300,331 | 11/1981 | Yoshiba | 53/573 |
| 4,365,458 | 12/1982 | Palmer et al. | 53/449 |
| 4,494,900 | 1/1985 | Johnson et al. | 414/27 |
| 4,551,966 | 11/1985 | Aoyagi et al. | 53/571 |
| 4,571,645 | 2/1986 | Johnson et al. | 360/98 |
| 4,646,178 | 2/1987 | Garratt et al. | 360/98 |
| 4,685,277 | 8/1987 | Ilsemann | 53/474 |
| 4,693,659 | 9/1987 | Burke et al. | 414/131 |
| 4,716,711 | 1/1988 | Signoretto | 53/460 |
| 4,720,230 | 1/1988 | Johnson et al. | 414/131 |
| 4,727,509 | 2/1988 | Johnson et al. | 364/900 |
| 4,733,856 | 3/1988 | Gunther, Jr. | 270/1 |

Primary Examiner—Allen MacDonald
Attorney, Agent, or Firm—Paul Sjoquist

[57] ABSTRACT

A system for automating the processing and packaging of prerecorded diskettes, including a label printer and applicator for applying the printed labels as the diskette moves along a conveyor, a diverter for rejecting faulty diskettes, a sleever for inserting collator cards into predetermined positions in an output bin where the sleeved diskettes are placed, all under automatic control of a control processor.

44 Claims, 13 Drawing Sheets

DISKETTE FINISHING UNIT

BACKGROUND OF THE INVENTION

The present invention relates generally to a system for assisting in the recording, checking and packaging process for magnetic diskettes, which have become popularly known as "floppy disks." These diskettes are typically comprised of a flat plastic substrate coated with magnetic particles, most commonly available in the diameter size of 3 ½ and 5 1/4 inches. The smaller size diskette is typically totally enclosed within a hard plastic outer shell, with a movable shutter for accessing the magnetic media. In the case of the larger diskette, it is held within a protective outer cover, wherein the cover has a radially-extending slot opening, for purposes of magnetically recording and reading information from the surface of the diskette. For purposes of this invention the term "diskette" should be construed to include, in the case of larger diskettes, not only the magnetially-recorded flat plastic substrate, but also the protective cover into which the magnetic substrate is inserted. The process of producing prerecorded diskettes includes an apparatus for magnetically prerecording information on the disk, and checking the prerecorded information for accuracy, and this apparatus is outside the scope of the present invention.

The invention particularly relates to subsequent steps in the process; namely, apparatus for receiving the prerecorded diskette, printing and applying an appropriate identifying label to the diskette, inserting the diskette into an envelope or sleeve, and depositing the diskette and sleeve into an appropriate output bin. The invention also contemplates a collator device for inserting separator cards between selected groups of prerecorded diskettes, for cases in which more than one diskette is intended to be combined into a single sales package. The invention also contemplates a rejection output bin for collecting prerecorded diskettes which have failed the test for accuracy of recording, wherein the rejected diskettes are ejected before the diskette is inserted into a sleeve.

In the past, the process steps which are accomplished by the present invention have been accomplished more or less independently, thereby complicating the overall production process, and leading to errors in magnetic recording and in handling the recording of multiple-diskette sets. The prerecording of information onto magnetic diskettes has been highly automated, and it is therefore desirable to provide an automated apparatus for receiving the prerecorded diskettes and for completing the steps required during the production process. The present invention accomplishes this purpose, while at the same time providing for automatic ejection of poorly prerecorded disks, prior to insertion into a sleeve.

A further advantage and feature of the present invention is to provide a packaged diskette wherein the diskette label may be printed with a serial number and other identifying information which has been magnetically recorded on the surface of the plastic substrate, thereby providing precise identity information on the label which corresponds identically with information prerecorded on the disk.

Another feature and advantage of the present invention is to provide a subsystem for collating multiple diskettes into presorted groups; i.e., when the volume of information required to be prerecorded is such that multiple prerecorded disks must be used, the system will automatically insert collator cards to separate consecutive groups of prerecorded diskettes wherein each diskette in a group contains a portion of the overall group information.

The present invention may be combined with a plurality of similar devices, and operated in parallel arrangement under control of a central processor unit. In this case, the central processor unit may provide expanded memory facilities for prestoring an extremely large volume of information to be prerecorded on a variety of diskettes, and this information may be electrically coupled to a plurality of duplicator machines, each duplicator machine connected in association with a unit of the present invention.

SUMMARY OF THE INVENTION

The present invention is a diskette finishing unit for automating the production steps in preparing and handling prerecorded diskettes, for accumulating and collating diskettes in an output bin for subsequent packaging and shipment. The invention includes a subsystem for printing and applying labels to the prerecorded diskette, a subsystem for ejecting rejected prerecorded diskettes, a subsystem for inserting acceptable prerecorded diskettes into a sleeve or envelope, an output bin for receiving the sleeved diskettes, and a collator for inserting dividers into the output bin between preselected groupings of collected diskettes. All of these subsystems are controlled and monitored by a control processor, which may be connected to a duplicator machine.

It is therefore a principal object of the present invention to automate the production steps required for producing prerecorded diskettes, properly labeled and inserted into sleeves, and collected in collated groups.

It is another object of the present invention to provide an apparatus for rejecting prerecorded diskettes having information errors, prior to inserting such defective diskettes into a sleeve.

DESCRIPTION OF THE PREFERRED EMBODIMENT

Figure 1:
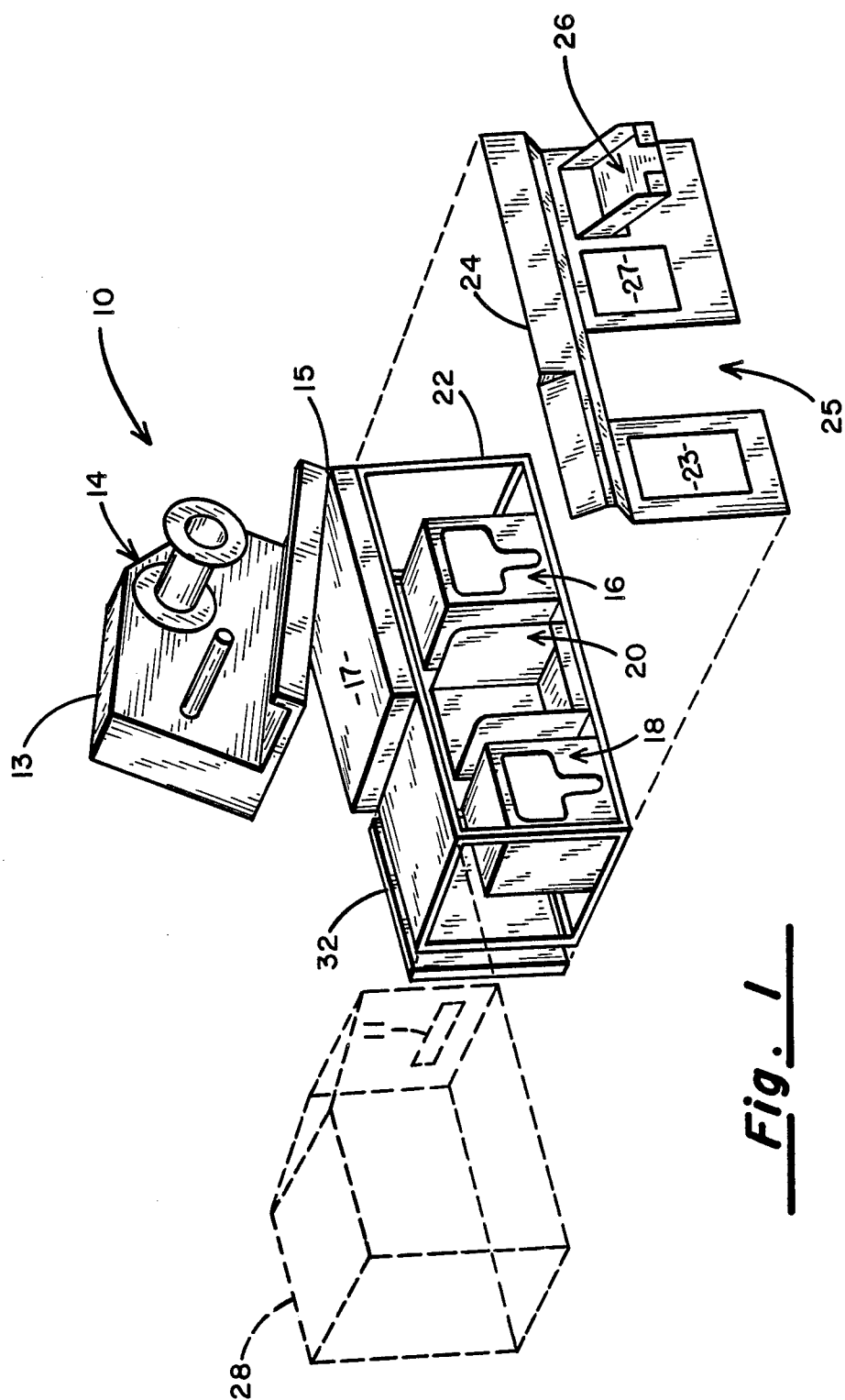
FIG. 1 is an exploded perspective view of the invention and its related apparatus.

Referring first to FIG. 1, there is shown an isometric and exploded view of a diskette finishing unit 10. Diskette finishing unit 10 receives prerecorded diskettes from a duplicator 28, which in operation is mounted closely adjacent to diskette finishing unit 10. The labeler/printer module 14 is shown in its open position, wherein an upper assembly 13 is pivotal about a hinge 15 connecting to lower assembly 17. The labeler/printer module is supported on a frame 22, which also houses a sleever/diverter module 16, a collate module 18, and an output bin 20. A front panel 24 is attachable to frame 22, having a reject chute 26 projecting therefrom. An opening 25 in front panel 24 enables output bin 20 to be inserted and removed from within frame 22. A window 23 opening through front panel 24 provides viewing and access to collate module 18 when front panel 24 is affixed to frame 22. Similarly, a window 27 in front panel 24 provides viewing and access into sleever module 16. A control processor 32 is attached along the rear side of frame 22, and is electrically connected to the various modules and subsystems of the invention, and to duplicator 28.

Duplicator 28 is a commercially available machine for prerecording diskettes, and does not itself form a part of the present invention. One from of duplicator 28 which is well suited for use in connection with the present invention is available as the MST Mode 6000, manufactured by Media Systems Technology, Inc., of Santa Ana, California. This duplicator has the capability of prerecording diskettes, and checking the prerecorded information for recording errors, and for generating electrical signals to identify diskettes wherein recording errors have occurred. This duplicator also has the capability of transmitting diskette-identifying information, including unique serial number identifiers, in a form which may be readily received and conveyed to a label printer, for subsequent application of preprinted labels to the diskette. This duplicator also has the capability of prerecording multiple diskettes in cases where the volume of information to be prerecorded exceeds the storage capability of a single diskette, and in such cases the duplicator has the further capability of signaling when a prerecorded group of related diskettes has been processed.

In an operable use duplicator 28 is physically positioned closely adjacent to diskette finishing unit 10. Duplicator 28 is arranged to have an ejection window 11 in alignment with a receiving window in labeler/printer module 14, so that prerecorded diskettes may be fed directly into the receiving window of labeler/printer module 14. Duplicator 28 is electrically connected to a control processor 32 in diskette finishing unit 10, receiving signals to be hereinafter described from the control processor 32, which itself is connected to each of the subsystems in diskette finishing unit 10. Duplicator 28 also transmits signals to the control processor 32, and the control processor 32 transmits signals to the respective subsystems to control the processing steps.

Figure 2:
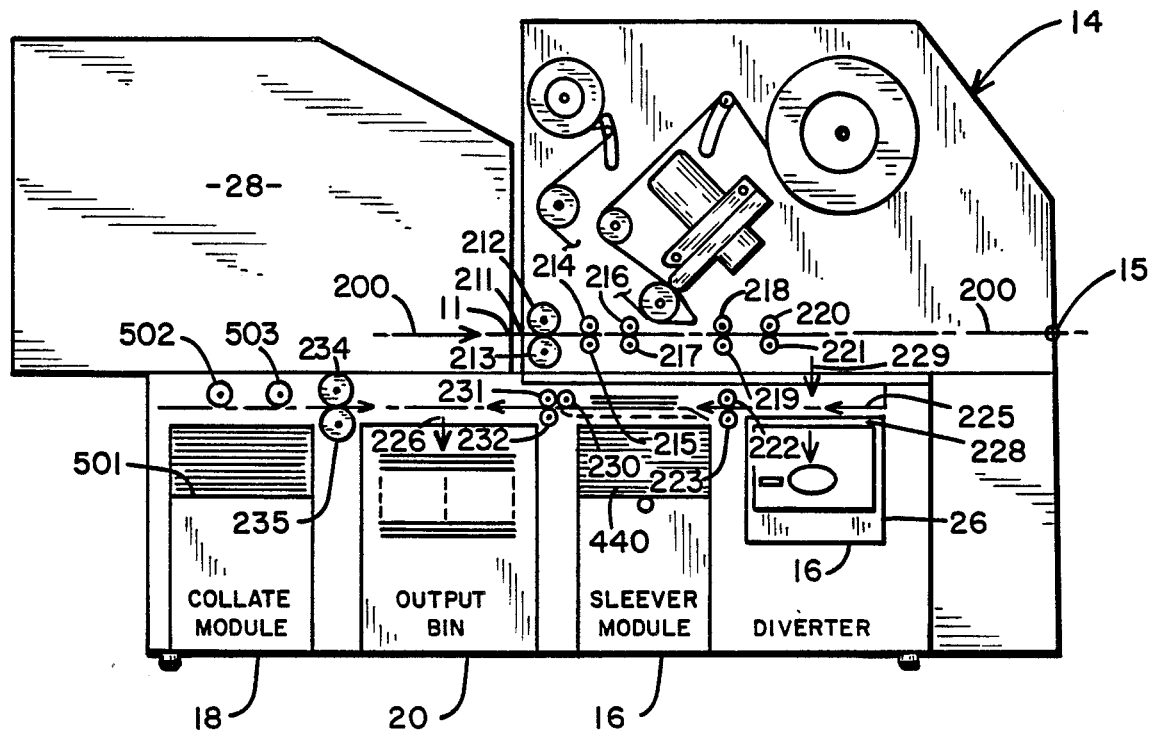
FIG. 2 is a diagrammatic elevation view of the invention.

Referring next to FIG. 2, there is shown a diagrammatic elevation view of the invention and associated equipment. Duplicator 28 has an output window 11 positioned between drive rollers 212 and 213. Prerecorded diskettes are conveyed through this output window and are received by drive rollers 212 and 213 into labeler/printer subsystem 14, and the diskettes are conveyed along axis 200 in a direction generally shown by the arrows on axis 200. Labeler/printer module 14 has an input window 211 for receiving the prerecorded diskettes between drive rollers 212 and 213, and further transporting the diskettes along axis 200. A plurality of further drive rollers 214-221 transport the diskette along axis 200 through the interior of labeler/printer module 14. An open chute, which forms a part of sleever/diverter module 16, permits the diskettes to drop downwardly in the direction of arrow 229, onto an openable gate 228, which either diverts the diskettes toward reject chute 26, or allows drive rollers 222 and 223 to convey the diskette leftwardly along axis 225 in the direction of the arrows. The diskettes then travel through the sleever/diverter module 16, wherein the diskettes are inserted into an envelope or a sleeve. The sleeved diskettes are then ejected from sleever/diverter module 16 by drive rollers 230-232 toward output bin 20. The sleeved diskettes are permitted to fall downwardly into output bin 20 under the force of gravity, as shown by arrow 226. Periodically, a separator card or sheet may be conveyed by drive rollers 234, 235 rightwardly along axis 225 toward output bin 20, to fall downwardly into output bin 20.

Sleever/diverter module 16 contains an upwardly spring-biased platform 440 for holding a supply of sleeves, so that as each new sleeve receives a diskette and is ejected from sleever/diverter module 16, a new sleeve is moved upwardly into position for receiving a subsequent diskette. Collate module 18 similarly contains an upwardly spring-biased platform 5501 for holding a supply of separator cards or sheets, so that a separator sheet is always in position for ejection from collate module 18 into output bin 20 via drive rollers 502, 503, 234, 235.

Figure 3A:
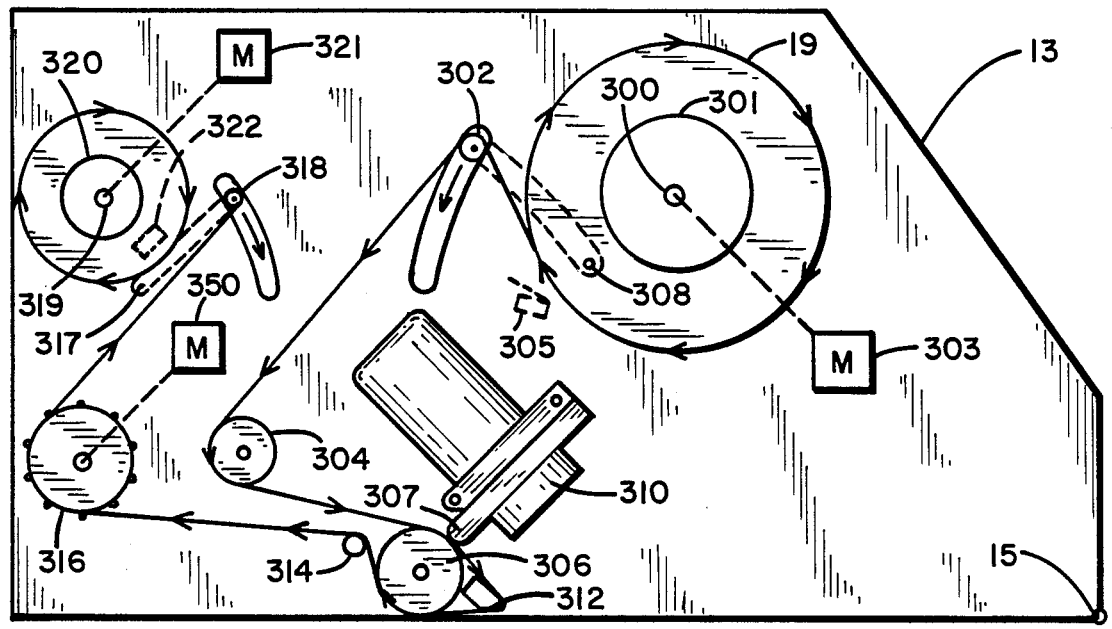
FIG. 3A is a diagram showing the operation of the label subsystem.

FIG. 3A shows a schematic diagram o the label conveyor and printer which is housed within upper assembly 13 of labeler/printer module 14. The labels adapted for use with the present invention are preferably labels which are lightly adhesive at spaced intervals along a roll 19 having a smooth surface from which the labels ma be readily peeled. Such labels are commercially available in any of a wide variety of dimensions, and the roll stock to which the labels are applied is typically perforated along its edges for transport by a tractor mechanism connected to drive sprocket 316. It should be appreciated that labeler/printer module 14 can equally well be adapted to labels which are adhesively held on fan-fold sheets having edge perforations for transport by a tractor mechanism. However, the embodiment described herein uses labels applied on roll stock. The label roll stock is held by a supply hub 301 which is rotatable about an axis 300 by connection to a supply hub drive motor 303. The direction of rotation of the label roll 19 is as shown by the arrows, along the path of travel to be hereinafter described. Th label roll feeds from supply hub 301, about a bail arm 302 and an idler roller 304, to a print capstan 306. The label roll passes between print capstan 306 and print head 307 of printer 310, with the label side of the label roll upwardly directed toward print head 307. The label roll next passes about peeler blade 312 wherein the label is peeled from the underlying roll stock. The roll stock continues its feed path along the direction of the arrows, passing over idler arm 314 and about drive sprocket 316. Drive sprocket 316 is driven by a stepper motor 350 to cause the movement of the roll stock. The roll stock next proceeds about bail arm 318 to take-up reel 320. Reel 320 is rotatably driven about axis 319 by take-up drive motor 321. Bail arm 302 is pivotal about axis 308, and is spring biased in an upwardly direction. A limit switch 305 is positioned to activate when bail arm 302 reaches the lower end of its swig, and limit switch 305 will activate motor 303 to cause rotation of supply hub 301 about axis 300. Similarly, bail arm 318 is pivotable about axis 317 and is spring biased in an upward position. A limit switch 322 is positioned to become activated when bail arm 318 reaches a point near the upper end of its swing, and limit switch 322 activates motor 321 to drive take-up reel 320 about axis 319. Bail arms 302 and 318 together apply tension to the roll stock in its path of travel between their respective positions. When stepper motor 350 is activated it causes drive sprocket 316 to impart linear movement to the roll stock, and the respective bail arms swing about their axis of rotation to maintain this linear tension during activation of stepper motor 350.

Printer 310 may be selected from any of a number of commercially available products. For example, a 24-wire dot matrix printer manufactured by Toshiba under product designation 321SL is suitable. Printer 310 preferably receives signals which originate in duplicator 28, which signals not only control the activation of printer 310, but also control the content of the data to be printed on labels. The control processor 32 in diskette finishing unit 10 generates and receives a number of signals to be hereinafter described, for coordination of a particular prerecorded diskette after it has been ejected from duplicator 28, and along its path of travel through diskette finising unit 10. Therefore, through the use of appropriate timing and position control signals, to be hereinafter described, the control processor 32 can appropriately activate printer 310 to print a suitable label for a diskette in position coincidence with the diskette as it passes beneath the peeler blade 312, where the label is removed from the roll stock and is applied to the diskette. After the label has been applied to the diskette, drive rollers 218–221 transport the diskette rightwardly along axis 200 to a position overlying the sleever/diverter module 16.

Figure 3B:
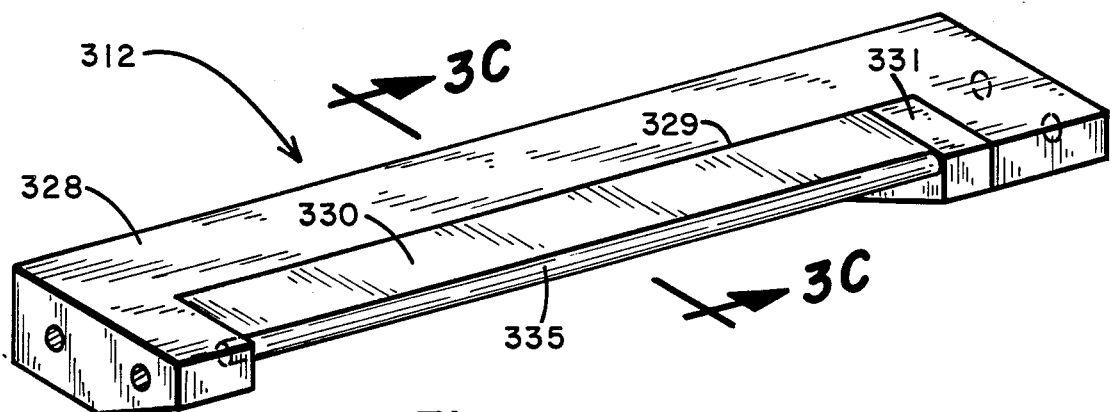
FIG. 3B is an isometric view of the peeler blade.
Figure 3C:
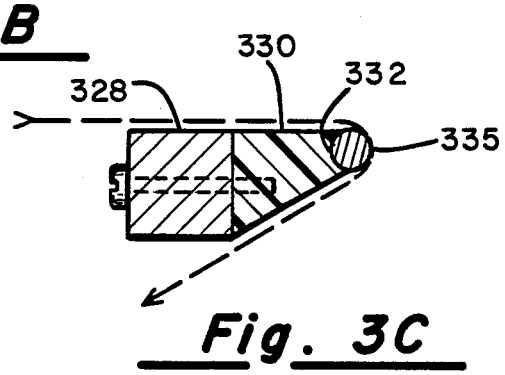
FIG. 3C is a cross-section view taken along the lines C-C of FIG. 3B.

FIGS. 3B and 3C illustrate further details of peeler blade 312. Peeler blade 312 is formed of a blade block 328, which is fixedly attached to upper housing 13. Blade block 328 is preferably made from a material such as aluminum, and has a centr notch 329. Fitted within notch 329 is a bearing block 330, preferably formed from a plastic material such as Dlrin, and an end spacer 331 formed of similar material. A needle roller 335 is rotatably mounted within openings in blade block 328 and spacer 331, slightly spaced away from a complementary-shaped arcuate front face 332, ound on bearing block 330. The openings into which needle roller 335 is inserted are sufficiently larger than the diameter of the neede roller so as to permit free rotation therein. Similarly, needle roller 335 is spaced slightly away from arcuate surface 332 of bearing block 330 so as to provide free rotation of needle roller 335. However, the tension placed upon the roll stock which passes over needle roller 335 tends to pull needle roller 335 into rolling bearing contact with arcuate surface 332, thereby providing a bearing support for needle roller 335 when label stock under tension is passed thereover. FIG. 3C shows generally the passage of the label roller stock over peeler blade 312, and particularly about needle roller 335. As the roll stock rotates over needle oller 335 and travels through a sharp reverse angle, the labels applied thereto peel away from the underlying paper, because the label stock is unable to traverse the sharp angle about needle roller 335. These labels are then applied to the diskette which, in time and space coincidence, passes beneath peeler blade 312 as the label is peeled away from the underlying roller stock.

Figure 3D:
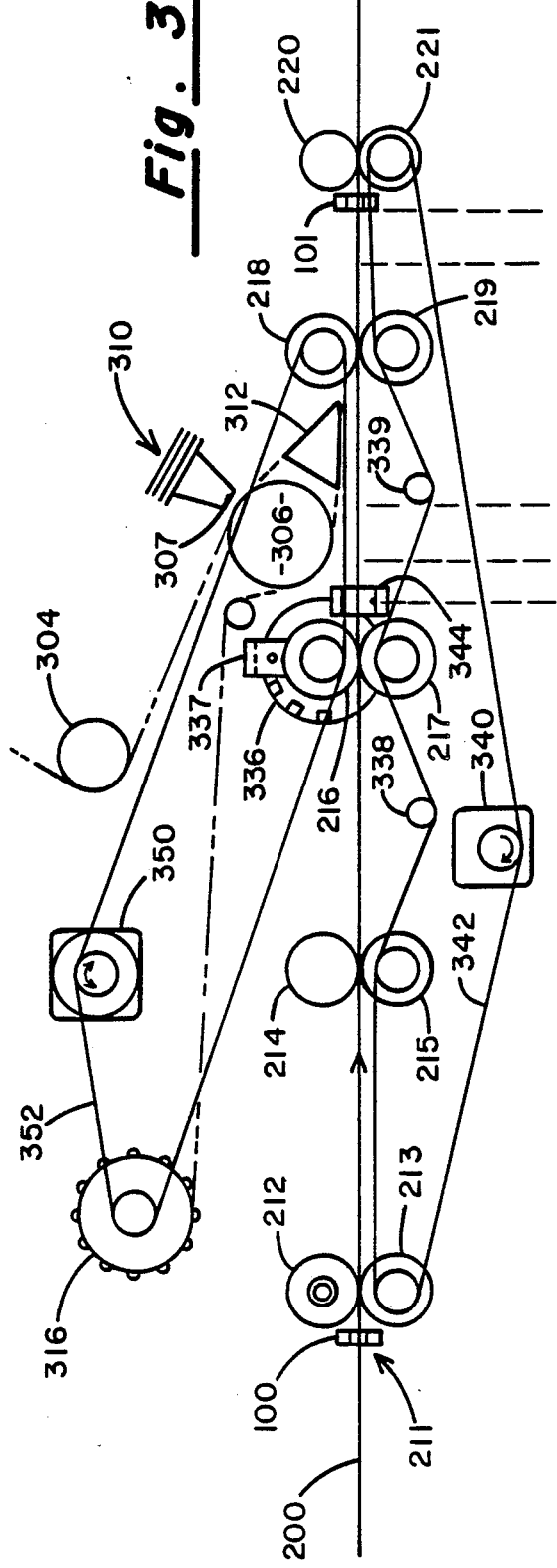
FIG. 3D is a diagram of the labeler/printer drive subsystem.

FIG. 3D shows a diagram illustrating the roller drive subsystem of labeler/printer 14. A first motor 340 is connected in driving relationship to a belt 342. Belt 342 extends in a continuous loop about rollers 213, 215, 217, 219, and 221. Motor 340 drives at a continuous rotational speed, which in the preferred embodiment provides a linear motion of belt 342 of about three inches per second. Motor 340 is a commercially available component, as for example Model PA3232-004, manufactured by Hurst Manufacturing Division of Emerson Electric Company, Princeton, Indiana. Rollers 213, 215, 217 and 219 each has an overdrive clutch associated with its mounting assembly. The overdrive clutch mechanisms permit these rollers to move at a linear speed faster than the driven speed from motor 340, if the rollers associated with belt 342 ar themselves driven at a faster speed. Several idler pulleys 338 and 339 are used to properly tension belt 342 in its path of travel about the respective pulleys.

The overdrive clutch mechanism associated with roller 213 permits a diskette to be received through window 211 at a linear speed in excess of three inches per second. Roller 213 is in contact with roller 212, and roller 212 is freely rotatable. Therefore, if a diskette enters window 211 at a linear speed in excess of three inches per second, the combination of rollers 212 and 213 will permit receipt of the diskette, but will tend to slow the linear speed of the diskette down to three inches per second as it passes between rollers 212 and 213.

The overdrive clutch assembly associated with roller 215 operates in a similar manner; roller 214 is freely rotatable, and is in driving contact with roller 215. Therefore, a diskette which enters between rollers 214 and 215 will be received, and the conveying speed therethrough will tend toward three inches per second.

The overdrive clutch mechanism associated with rollers 217 and 219 similarly permit these rollers to travel at a rotational speed higher than the nominal three inches per second which drives these rollers via belt 342. Roller 217 is in driving contact with roller 216, and roller 219 is in driving contact with roller 218. Rollers 216 and 218 are intermittently driven by motor 350 and belt 352 at a linear speed of approximately four inches per second. During these intermiteent driving periods, the higher rotational speed of rollers 216 and 218 will impart a corresponding higher rotational speed to rollers 217 and 219, to facilitate movement of diskettes passing between these rollers at a linear speed of approximately four inches per second.

A second motor 350 is a stepper motor connected in driving relationship to a belt 352. Belt 352 is coupled in an endless loop fashion about drive sprocket 316, and drive rollers 216 and 218. Stepper motor 350 is also a commercially available component, as for example Model M062-FD03, manufactured by Superior Electric Company of Bristol, Conn.. Stepper motor 350 is connected to drive belt 352 at a linear speed of approximately four inches per second in the preferred embodiment, and stepper motor 350 is typically intermittently operated. Rollers 216 and 218 each have an overdrive clutch mechanism associated with its mounting assembly, so that these rollers may be overdriven by an external drive source if stepper motor 350 is not operating. In the present invention, in times when stepper motor 350 is shut off, rollers 216 and 218 may be driven at a constant speed of approximately three inches per second by virtue of the contacting relationships between rollers 216 and 217, and rollers 218 and 219. Since motor 340 is continuously driven, rollers 217 and 219 are continuously rotated, and frictional contact between these rollers and rollers 216 and 218 will cause rollers 216 and 218 to move at the same linear speed as belt 342. When stepper motor 350 is turned on, belt 352 causes rollers 216 and 218 to rotate faster than their respective counterparts, i.e., rollers 217 and 219. In this situation, the higher linear speed of belt 352 will cause rollers 217 and 219 to rotate faster. This drive technique also permits belt 352 to reverse direction while belt 342 continues to transport the diskette through labeler/printer 14.

A diskette which is fed into the input 211 will travel along axis 200 at a linear speed determined by motor 340, if stepper motor 350 is off. On the other hand, if stepper motor 350 is turned on then the diskette will travel along axis 200 at a higher speed as determined by stepper motor 350. If stepper motor is turned on in the reverse direction, the diskette will continue to travel rightwardly along axis 200, at a linear speed determined by motor 340.

A sensor 344 is arranged along axis 200, to detect the passage of a diskette therethrough. Sensor 344 generates a signal at the time a disk passes the sensor position, and this signal is used in conjunction with a signal from a code wheel counter to activate stepper motor 350. A code wheel 336 is affixed to the same shaft as roller 216, code wheel 336 having a pattern of signal switching marks regularly spaced about the outer periphery. Code wheel 336 passes adjacent to sensor 337, and sensor 337 generates a signal each time one of the code wheel marks is detected. The signals from sensor 337 are fed into a code wheel counter (not shown), which is combined in a gating circuit with the output from sensor 344. When a diskette passes along axis 200 and is detected by sensor 344, the gating circuit associated with sensor 344 permits signals from sensor 337 to be accumulated in the code wheel counter. After a predetermined number of these signals have been accumulated, stepper motor 350 is activated to drive belt 352. The activation of stepper motor 350 is accomplished by stepper motor drive signals which are derived from a predetermined number of count accumulations in the code wheel counter, and thereafter stepper motor 350 reverses direction for a predetermined number of stepper motor drive signals. Since steeper motor 350 drives both the drive sprocket 316, which moves the label roll about its path of travel, and also drives rollers 216 and 218, which moves the diskette along its path of travel on axis 200, there is a period of time when both driving operations take place simultaneously. This displacement is carefully regulated by a predetermined number of stepper motor drive signals which determines a preset number of linear incremental steps of movement of stepper motor 350. Sufficient reverse displacement is provided to permit the next label to become repositioned for the next printing operation.

As a result of the combined and unified linear motion of belt 352, driving label sprocket 316 and diskette drive rollers 216 and 218, both the diskette and the label roll travel at the same speed past peeler blade 312. Peeler blade 312 therefore peels the label from the label roll stock, and the label becomes applied to the diskette which is at that moment passing adjacent to peeler blade 312 at the same rate of speed. The diskette, with label attached, continues its rightward movemnt along axis 200 until it passes rollers 220 and 221 and falls downwardly as described hereinabove.

Figure 3E:
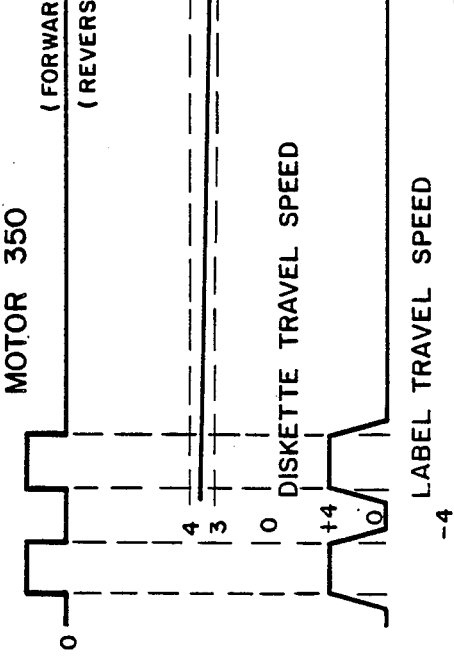
FIG. 3E is a timing diagram associated with FIG. 3D.

FIG. 3E is a timing diagram illustrating the activation of stepper motor 350, and the relative linear speeds of the diskette and label roll stock. The timing sequence of FIG. 3E is aligned beneath the diagram of FIG. 3D in timed synchronism with respect to the relative positions of a diskette passing along axis 200. Prior to the diskette entering window 211, stepper motor 350 is activated one or more times in conjunction with printer 310 to print one or more lines of information on the label, which has been propositioned beneath print head 307. As the diskette passes between rollers 212 and 213 it assumes a linear speed of three inches per second, as governed by motor 340; at this point in its travel stepper motor 350 is turned off, and the label roll stock is thereby stationary. The continuous linear speed of three inches per second is maintained until the diskette passes through sensor 344, causing activation of signals from the code wheel 336 and sensor 337. After a predetermined number of code wheel signals have been detected by sensor 337, stepper motor 350 is turned on and both the label roll stock and the diskette assume a speed of four inches per second. The label is applied to the diskette by the peeler blade 312 during this phase of motion. The diskette speed and roll stock speed continue to be maintained at four inches per second until a predetermined number of stepper motor drive signals have been generated. At this time, stepper motor 350 becomes energized in the opposite direction, thereby causing belt 352 to move in the reverse direction at a speed of four inches per second. This causes the roll stock to reverse its direction of travel to cause the next label on the roll stock, which has passed the print head, to back up to a predetermined position and then move forward to a position for printing under the print head. Stepper motor 350 is then shut off to await the arrival of the next diskette at entrance 211. The technique of first reversing the rotational motion of stepper motor 350 for a predetermined time, and then driving stepper motor 350 in a forward direction for a brief time interval, not only prepositions the label under the print head for the next subsequent printing operation, but also takes any slack out of the label roll stock that might have accumulated. The amount of forward and reverse displacement is controlled by the control processor in diskette finishing unit 10, by simply generating the correct number of predetermined drive signals to stepper motor 350.

Figure 4A:
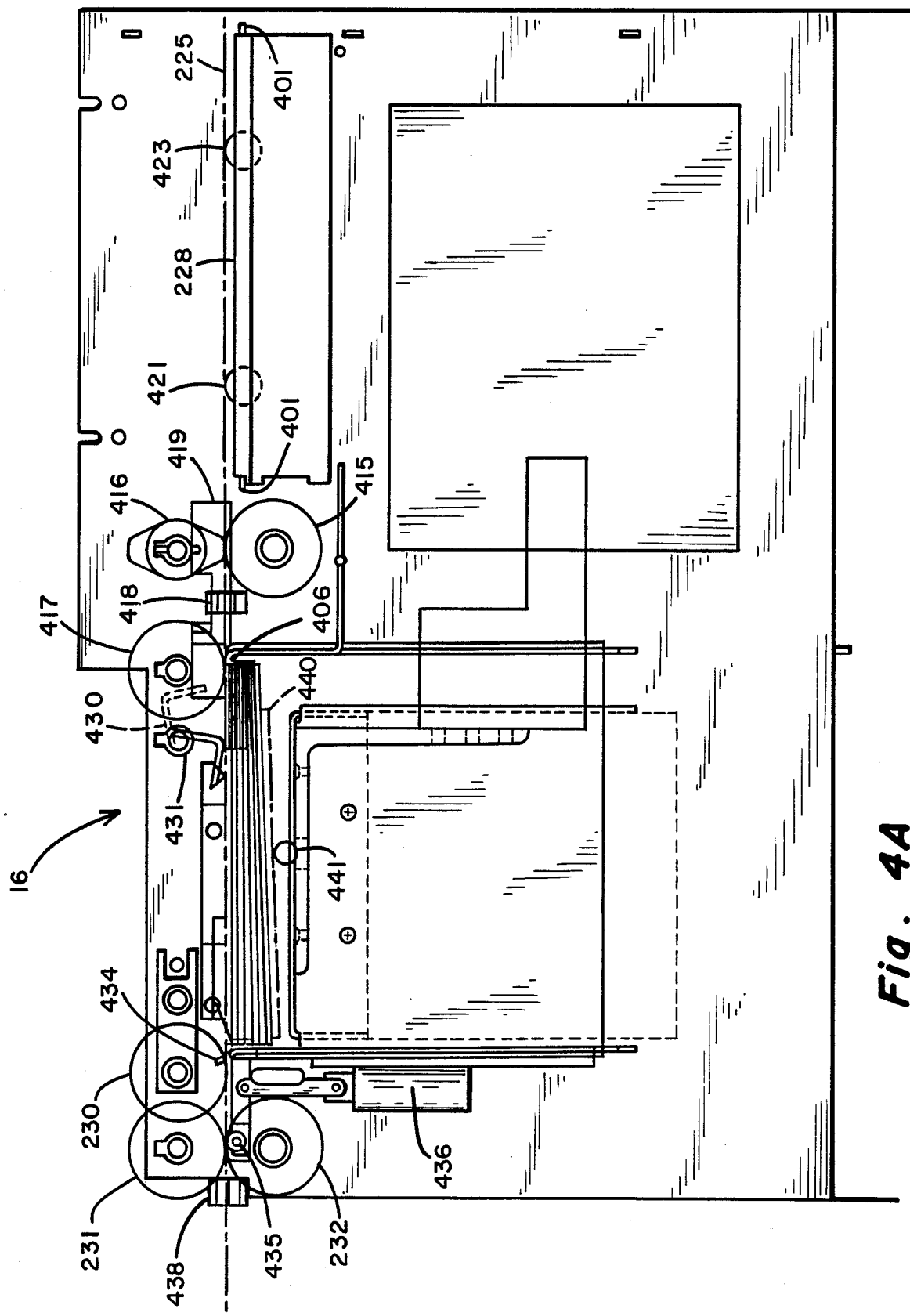
FIG. 4A is a cross-section view showing the sleever/diverter subsystem.

FIG. 4A shows an elevation view of sleever/diverter module 16 with the outside hosing removed. Axis 225 illustrates the plane of travel of the diskettes through sleever/diverter module 16. An openable gate 228 receives diskettes which are dropped downwardly from above, after transport through the labeler/printer module 14. Gate 228 is pivotally hinged about hinge pins 401, to support its top surface closely adjacent to axis 225. In this position gate 228 serves as a platform for receiving diskettes dropped from above, and permits the diskettes to be conveyed leftwardly along axis 225 into the sleeve module 16.

Four rollers 420-423, are continuously rotated by a motor (not shown) to rattle in a counterclockwise direction as viewed in FIG. 4A. These rollers protrude a short distance above the upper surface of gate 228, when gate 228 is in a horizontal position as shown in FIG. 4A. In this position, the four rollers 420—423 convey diskettes leftward along axis 225, as soon as the diskettes are dropped into sleever/diverter module 16 from above.

Figure 4B:
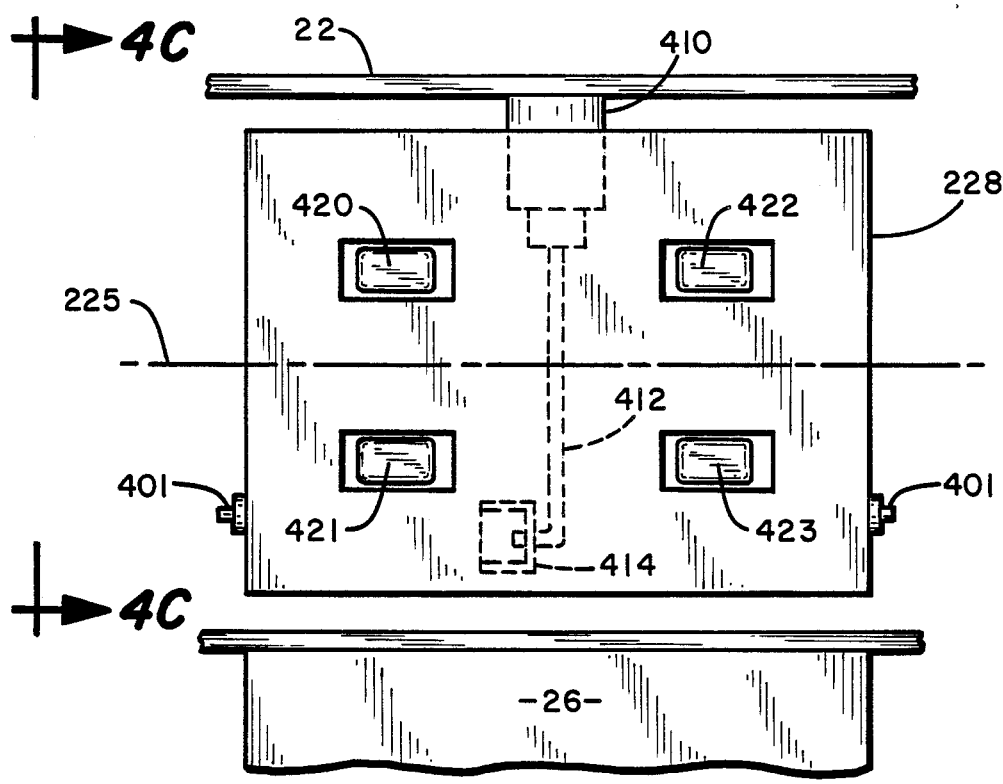
FIG. 4B is a top view of the diverter gate.
Figure 4C:
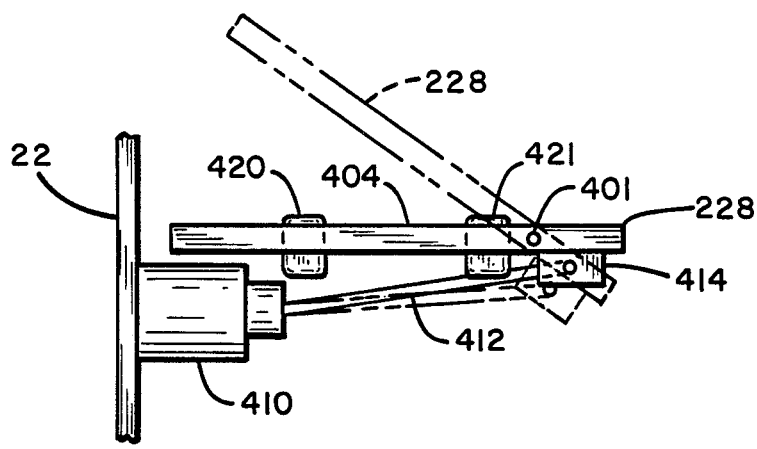
FIG. 4C is a view taken along the lines 4C—4C of FIG. 4B.

FIG. 4B shows a top view of the diverter portion, including gate 228 in its horizontal operable position. FIG. 4C shows a side view taken along the lines 4C—4C of FIG. 4B. Referring to FIGS. 4B and 4C, gate 228 is pivotally attached to structural members (not shown) which are affixed to frame 22, by means of hinge pins 401. Gate 228 is also supported by a connection to solenoid 410, through a solenoid arm 412 which is attached to a bracket 414. Rollers 420, 421, 422 and 423 are mounted so as to project slightly above the top surface 404 of gate 228, when ate 228 is in its horizontal position. When solenoid 410 is actuated it retracts solenoid arm 412, thereby pivoting gate 228 about hinge pins 401 and directing top surface 404 downwardly toward reject chute 26, as shown in dotted outline in FIG. 4C. When solenoid 410 is in its deactivated position the solenoid arm 412 is extended and gate 228 remains horizontal, as is illustrated in the solid lines in FIG. 4C.

The sleeve mechanism of sleeve/diverter module 16 is also illustrated in FIG. 4A, in cross-sectional elevation view. The entry point into the sleeve mechanism is along axis 225, which passes at the intersection of rollers 415 and half roller 416. Roller 415 rotates in a counterclockwise direction as viewed in FIG. 4A, and roller 416 rotates in a clockwise direction. Roller 416 intermittently comes into circumferential contact with roller 415, during the portion of its rotation when the elongated faces of the roller are pointed vertical. During the remainder of its rotation cycle, roller 416 is spaced away from roller 415, thereby providing an opening into the sleeve mechanism for accepting a diskette moved leftwardly by rollers in the diverter portion. A pair of guide rails 419 are positioned, one on either side of the path of travel of the diskette along axis 225. These guide rails 419 have a relatively wider spacing therebetween to receive the diskettes as they are conveyed by rollers 420-423, add a relatively narrower spacing toward the sleeve opening. Guide rails 419 therefore guide the diskettes into proper position and orientation for moving into the slevver subassembly. After a diskette moves into a position created by this opening, roller 416 will rotate into contact position and will provide an impulsive leftward force against the diskette, thereby forcing the diskette into the sleeve mechanism. In entering the sleeve mechanism, the diskette passes through an optical sensor 418 which detects the presence of the diskette at the entrance to the sleeve mechanism.

A sleever finger 430 is affixed to an oscillating shaft 431, which shaft 431 is connected to a motor (not shown) causing oscillatory motion. Sleever finger 430 rotates approximately 110°, from a first upper position shown in FIG. 4A, to a second lowerposition also shown in FIG. 4A. In its upper position, sleever finger 430 provides clearance for a diskette to move into sleever position along axis 225. In its lower position, sleever finger 430 becomes inserted into the open end of a sleeve, thereby lifting one side of the sleeve to force the sleeve into an open position for accepting a diskette. The lower side of the same sleeve is at the same time held by a projecting lip 406, so as to ensure an opening in the sleeve into which a diskette may be inserted. The normal position of sleever finger 430 is shown in solid line in FIG. 4A, and its intermittent retracted position is shown in dotted outline. Prior to a diskette passing through sensor 418 the sleever finger 430 has moved to its lower position, lifting one edge of the top sleeve stacked on platform 440. The other edge of the sleeve is held downwardly by projecting lip 406, thereby creating an enlarged opening for receiving the diskette. The cooperative action of rollers 415, 416 and 417 thereby permit the diskette to be easily inserted into the sleeve.

A sleeve gate 434 is pivotally mounted about an axis 435. Sleeve gate 434 has a blocking edge aligned across axis 225, to thereby prevent diskettes and sleeves from becoming ejected from the sleever mechanism. The sleeve gate 434 is also connected to a sleeve gate solenoid 436, and sleeve gate solenoid 436 may be energized to cause sleeve gate 434 to move downwardly about axis 435. When sleeve gate solenoid 436 is energized, sleeve gate 434 moves way from blocking contact with axis 225, and thereby provides an exit opening for sleeved diskettes to leave the sleeve/diverter module 16.

A supply of empty sleeves is retained on a platform 440, which is pivotally mounted about a centered pivot 441, so as to compensate for accumulative thickness regularities in the sleeves. Platform 440 and its associated pivot 441 are supported by a compression spring (not shown) which exerts a gentle upward force against the platform and the empty sleeves resting thereon. The sleeves which rest upon platform 440 are sized so as to fit within the platform 440 housing, so that the lower edge of a sleeve is captured by projecting lip 406, while at the same time the upper edge of a sleeve is positioned for access by sleeve finger 430. The conventional sleeves used for this purpose have, at their respective open ends, an elongated lower edge and a shortened upper edge, so that the interaction of lip 406 and sleeve finger 430 can be accomplished.

After a diskette has been inserted into a sleeve, solenoid 436 is activated to retract sleever gate 434 from blocking contact along axis 225. The sleeved diskette is then grasped by roller 230 and moved leftwardly along axis 225, coming into contact between rollers 231 and 232 for further leftward movement. The sleeved diskette is ejected through optical sensor 438, and the railing edge of the sleeved diskette passing through the sensor causes activation of the oscillatory motor coupled to oscillating shaft 431. Shaft 431 rotates about an angle of approximately 110°, lifting sleever finger 430 to its upper position momentarily, and then returns sleever finger 430 to its lower position. As sleever finger 430 returns to its lower position it moves beneath an edge of the next sleeve in the stack on platform 440, thereby opening this sleeve for receipt of the next diskette. In the meantime, the preceding sleeved diskette has been ejected from sleeve/diverter module 16 into output bin 20.

It should be appreciated that, in instances where the invention is to be used for the processing of 3-1/2 inch diskettes, there is no need to utilize the sleeve mechanism shown in FIG. 4A. In such cases the diskettes are already enclosed in a plastic package, and an additional outer sleeve is conventionally not used. However, the other aspects and features of the invention described herein may be used in the processing of 3-1/2 inch diskettes.

Figure 5:
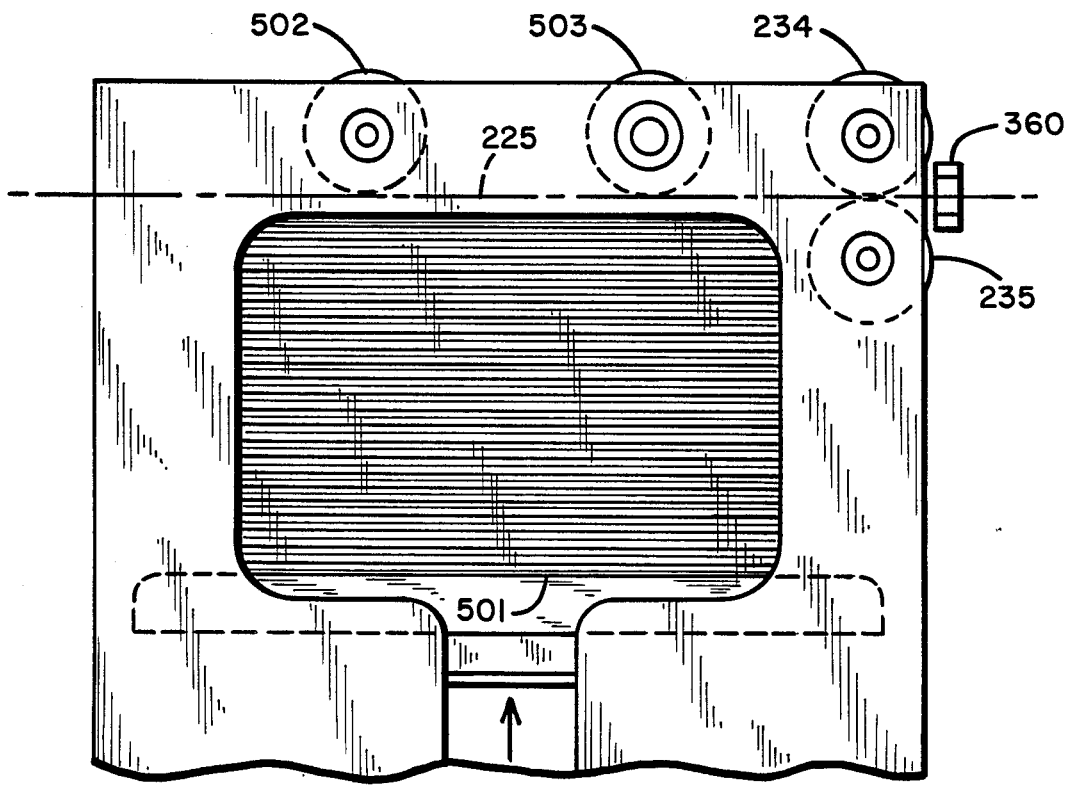
FIG. 5 is a cross-section view showing the collator subsystem.

FIG. 5 shows an elevation view in partial cross section of the collate module 18. Collate module 18 retains a supply of separator cards or sheets, supported on a spring-loaded platform 501, which biases the stack of cards in a generally upward direction. The topmost card in the stack is aligned along axis 225, in contact with the lower edges of pick rollers 502 and 503. Pick rollers 502 and 503 are mounted in one-way clutch assemblies, and rotate in a counterclockwise direction as shown in FIG. 5, after energization by a motor (not shown). When pick rollers 502 and 503 become energized, they move the topmost separator card rightwardly, through and into contact with continuously driven output rollers 234 and 235. Output rollers 234 and 235 grasp the card and move it rightwardly into output bin 20. It should be noted that the energization of pick rollers 502 and 503 is controlled by signals received from the control processor, which signal indicate that multiple diskettes in a set have been recorded, and a collator card is needed for separating the entire set of recorded diskettes from the next subsequent set.

Figure 6:
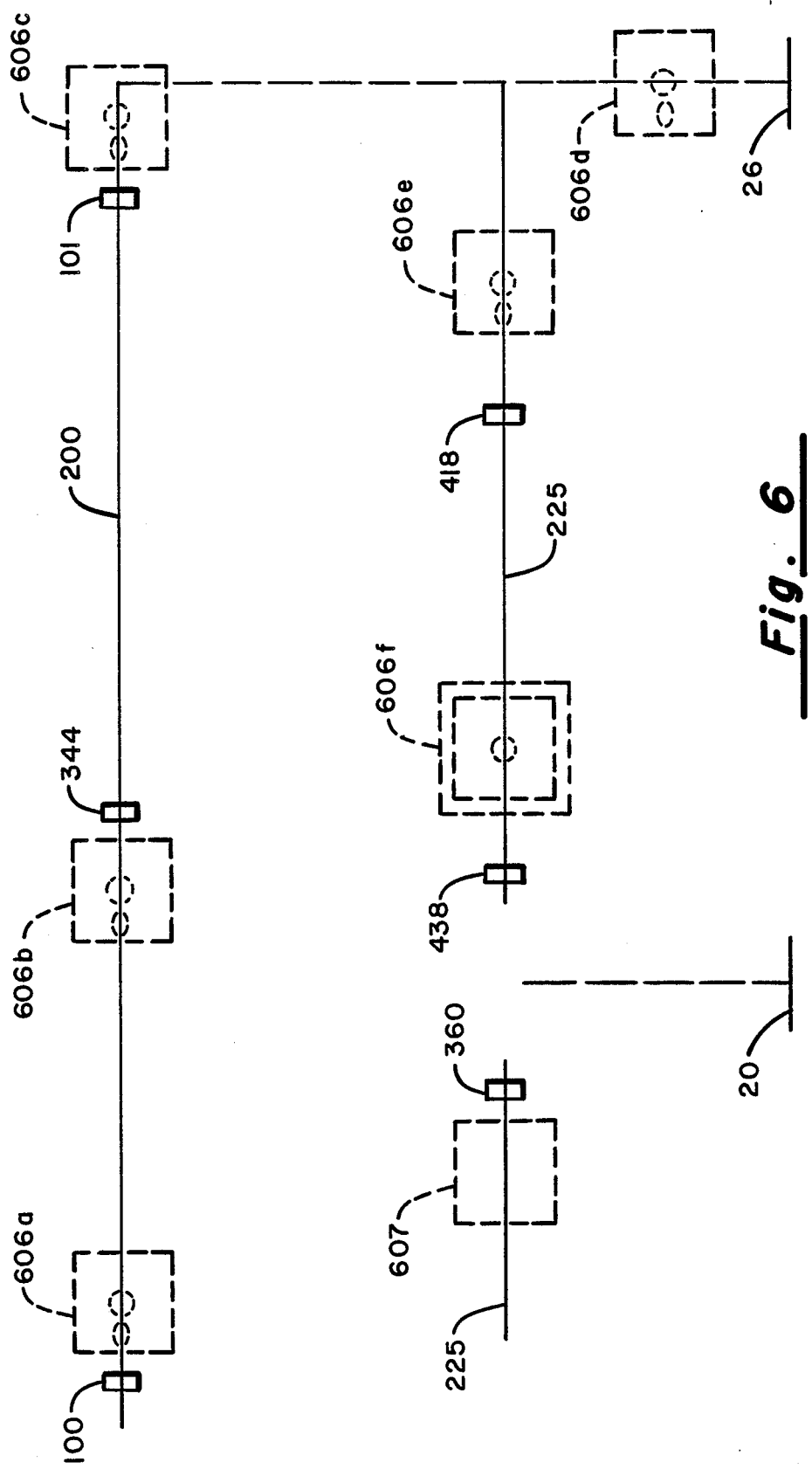
FIG. 6 is a schematic and timing diagram illustrating portions of the invention control system.

FIG. 6 shows a schematic and timing diagram, illustrating the control functions of the invention. The control functions are achieved by signals generated by control processor 32, in response to signals received from various sensors placed along the axes of travel of diskettes through the diskette finishing unit 10. Controls are also achieved by application of suitable timing devices, frequently in conjunction with sensors, so as to allow a predetermined time interval to pass from one control function to the next subsequent control function.

In particular, the upper portion of FIG. 6 symbolically illustrates the movement of a diskette rightwardly along axis 200, and the lower portion of FIG. 6 symbolically illustrates the movement of a diskette leftwardly along axis 225. A diskette 606a enters the diskette finishing unit at the left end of axis 200, from a feeding mechanism which does not form a part of the present invention. A sensor 100 at the entry point detects the arrival of diskette 606a and signals control processor 32. As the diskette moves along axis 200, to a position illustrated by diskette 606b, it is conveyed into the labeler/printer module 14. As the diskette is ejected from labeler/printer module 14 it occupies a position of diskette 606c, wherein it drops downwardly into the sleever/diverter module 16. If the diskette is to be rejected, the sleever/diverter module gate becomes tipped upwardly to move the diskette into the position illustrated by diskette 606d. In this position, diskette 606d has been placed into the reject bin 26. If the diskette is to be further processed and sleved, it moves leftwardly along axis 225 through the sleever mechanism, beginning with the position shown by diskette 606e. Sensors 418 and 438 monitor the position of the diskette as it passes through the sleever mechanism, to cause activation of the respective motors so as to move the necessary rollers and the sleever finger, to permit the diskette to become inserted into a sleeve, as is shown by diskette position 606f. The sleeved diskette is then moved leftwardly along axis 225, to drop into the output bin 20. The collator also lies along axis 225, and a collator card 607 is shown symbolically in position for moving rightwardly into output bin 20.

The respective storage mechanisms for retaining a supply of sleeves, collator cards, and rejected diskettes, all contain sensors for detecting when the contents of the bin become empty. These sensors become activated to set off an alarm and to stop the operation of the system until the empty bins can be refilled.

Figure 7A:
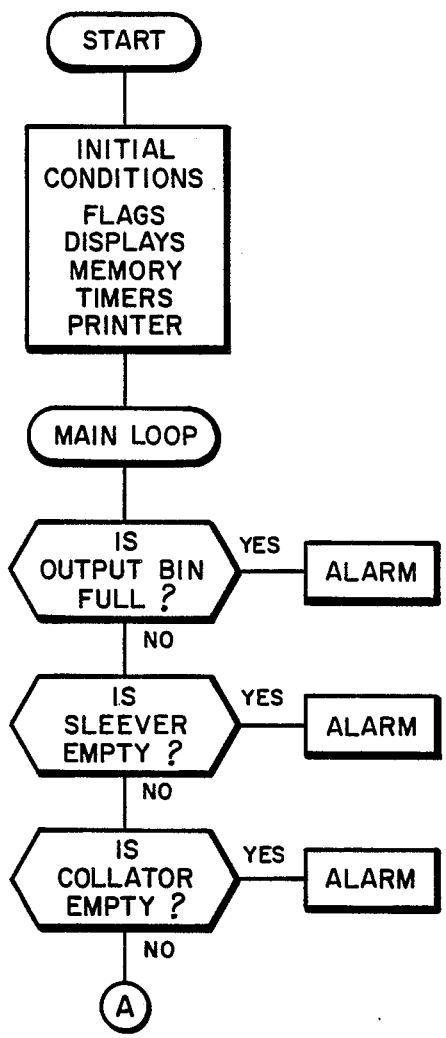
FIGS. 7A and 7B show the control processor initiation and main loop operation.
Figure 7B:
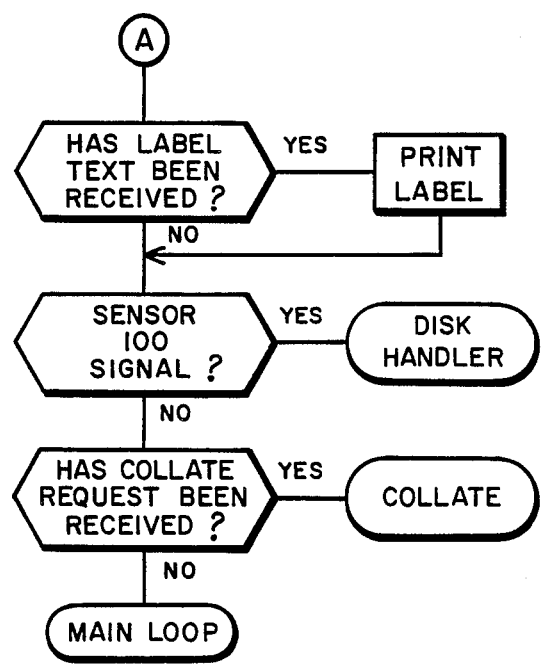

FIGS. 7A and 7B show the operation of the control processor, with respect to the initial operating conditions and the "main loop" operation. This operation may be implemented by software within control processor 32, in conjunction with signals received from duplicator 28. Signals from duplicator 28 are received in the form of external commands, which may be designated as follows:

Label Disk - a command which indicates that a label should be applied to the next diskette received at input window 211.

Sleeve Disk - a command which indicates that the next diskette arriving at inlet window 211 should be inserted into a sleeve.

Collate Request - a command which indicates that a separator card or sheet should be inserted into the output bin after the next diskette is processed.

Control processor 32 undertakes a number of initiation and housekeeping operations which are typical of automatic equipment of this type, such as initializing all internal flipflops and flags, setting up initial conditions for memory, initializing internal timers, and setting up initial conditions for the printer and labeling operation. After these initial conditions are set, the software enters the "main loop" program, which executes a continuous cycle of operations until a command or diskette is received from duplicator 28.

The "main loop" program interrogates sensors at the respective bins and hoppers to determine whether a supply of sleeves is available for use with the machine, to determine whether a supply of collator cards or sheets is available, and to determine whether the output bin has already been filled. Certain alarms may be activated if any of the conditions exist to prevent further operation of the system. These alarm conditions may take the form of an audible or visual alarm, as for example a visual dispaay which may be shown on a visual display panel. As a part of the "main loop" program, an examination of the input lines from the duplicator 28 is more or less continuously made, to determine whether text material for operating the printer has been received. When this occurs the printer operation begins, and concludes with printing of an appropriate label, intended for the next-arriving diskette. The "main loop" program also continuously interrogates sensor 100 to determine when a diskette arrives at the inlet window 211. When a diskette has been detected by sensor 100, the further operation of the control processor 32 is turned over to the "disk-handler" program. Similarly, when a collate request signal is received from duplicator 28, control of processor 32 is turned over to the "collate" program.

FIGS. 8A–8F illustrate the program flow diagrams for operation of the "disk-handler" program within the control processor 32. An important part of the "disk-handler" program is the "jam timer" operation. The "jam timer" is a software setable internal timer which may be set to an initial count representative of a predetermined time, and which counts down the preset time until it reaches a zero count, or is "timed out." The "jam timer" is used in conjunction with a number of operational steps within the "disk-handler" program, particularly to set maximum time limits for the receipt of certain sensor signals. If sensor signals are not received within time limits as determined by the "jam timer," the program presumes that a jam or fault condition exists, and an appropriate alarm is generated.

Figure 8A:
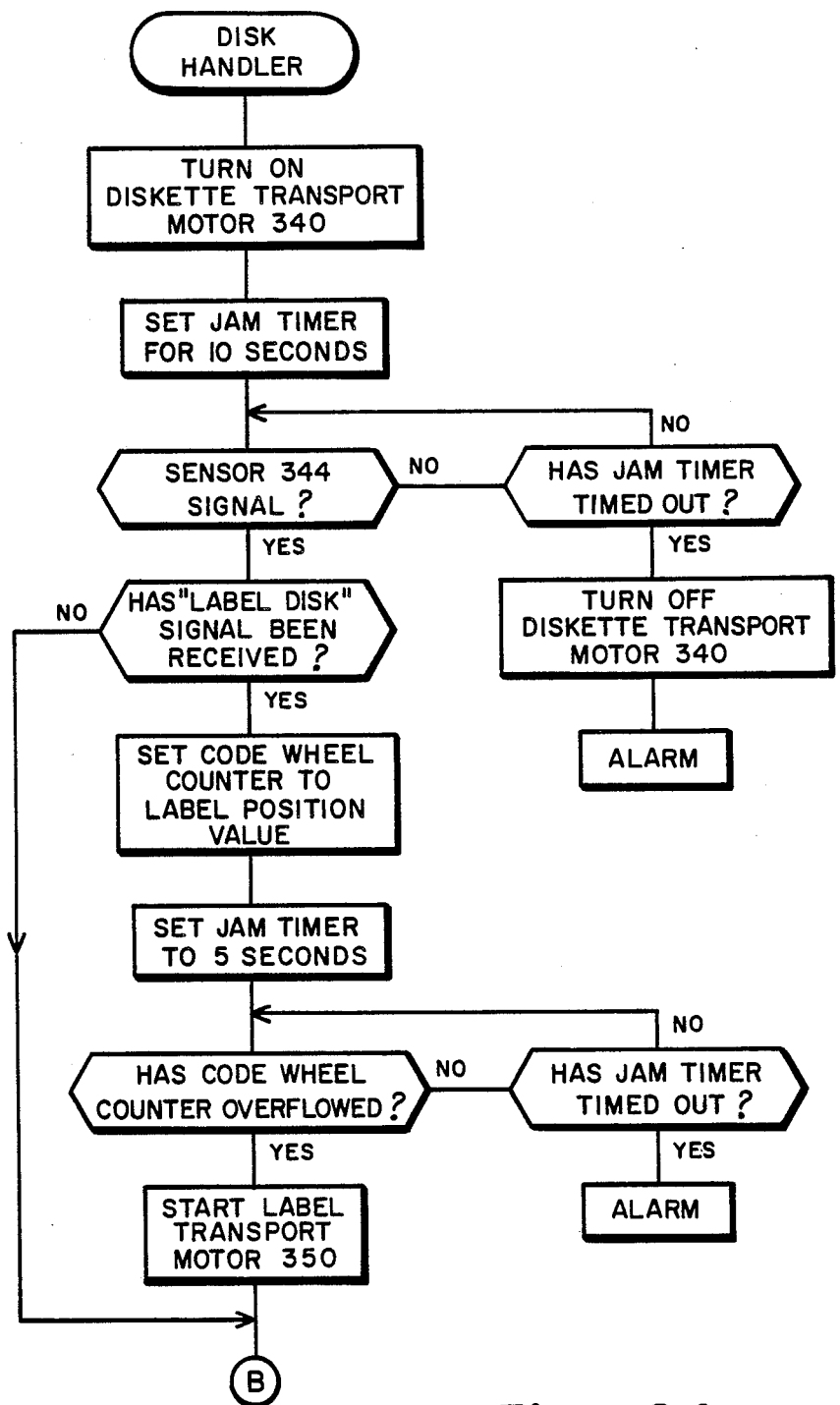
FIGS. 8A-8F show the control processor disk handler operation.
Figures 8B, 8C:
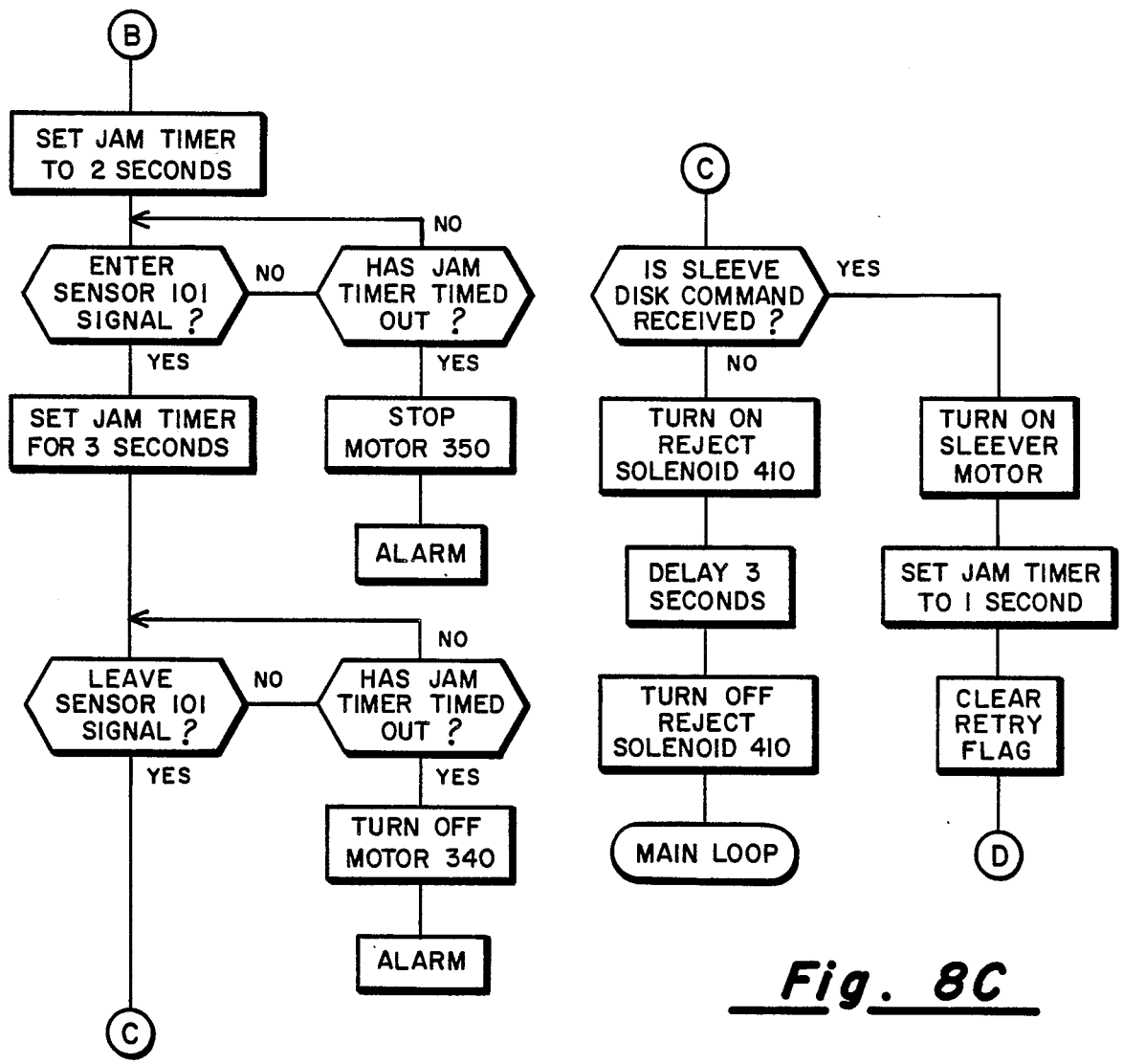

The "disk-handler" program initially turns on the diskette transport motor 340, to cause belt 342 to begin its linear movement at approximately three inches per second (FIG. 3D). The jam timer is set for ten seconds, and if a signal has not been received from sensor 344 within the ten second time period the motor 340 is shut off and an alarm is generated. If a signal is received from sensor 344 it indicates that the diskette has arrived at a position approaching the labeler mechanism, and the program then determines whether the externally-generated signal "Label Disk" has been received, which is the command to apply a label to the diskette. If this command has not been received the program does not activate the label transport motor 350 for the purpose of applying a label onto the diskette. If the command has been received a label as to be applied to the diskette, and code wheel 336 counter is set to a predetermined value. The jam timer is set to a time of five seconds, to allow time for the diskette to be transported into the labeler mechanism, and label transport motor 350 is activated. The jam timer is again set to a time of two seconds, to allow time for the diskette to pass into sensor 101, which is indicated by a signal received from sensor 101. Once this signal is received the jam timer is again reset for three seconds, to allow time for the diskette to pass through and leave sensor 101, and a signal i generated by sensor 101 at the time the diskette passes through (FIG. 8B).

If duplicator 28 has not sent a "sleeve disk" command, the reject solenoid 410 becomes activated and, following a three second delay, the reject solenoid 410 becomes deactivated and the program returns to the "main loop." Activation of the reject solenoid 410 is indicative of a diskette being deflected into the reject chute 26.

Figure 8D:
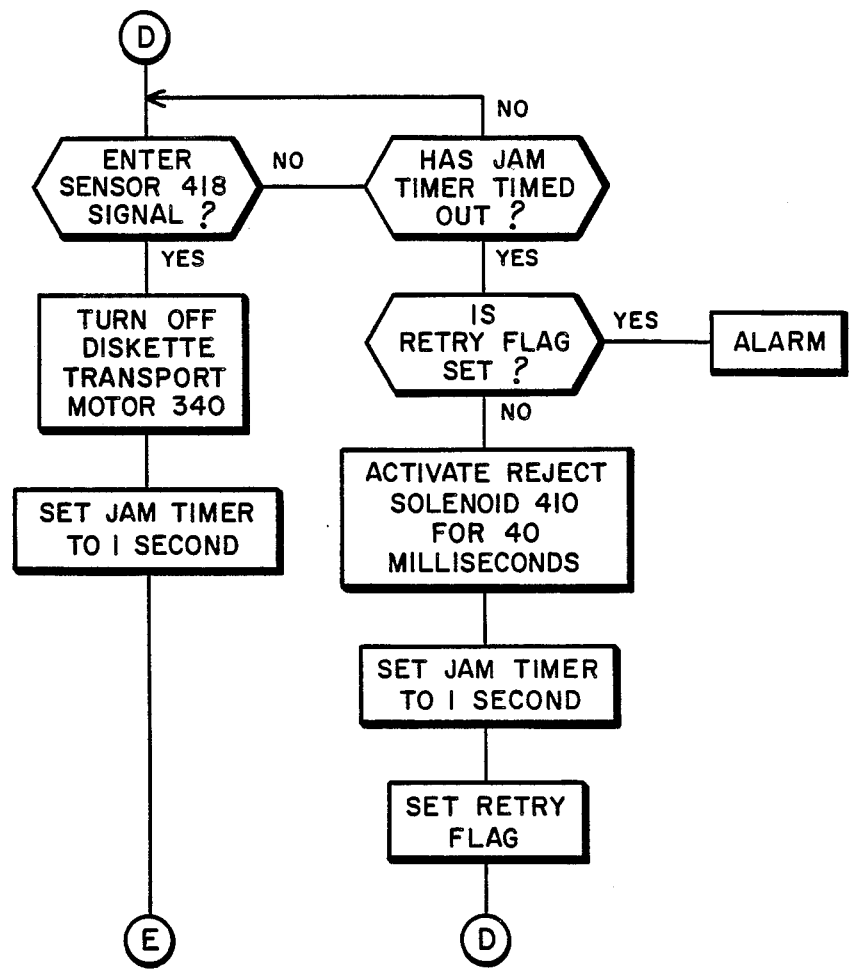
Figures 8E, 8F:
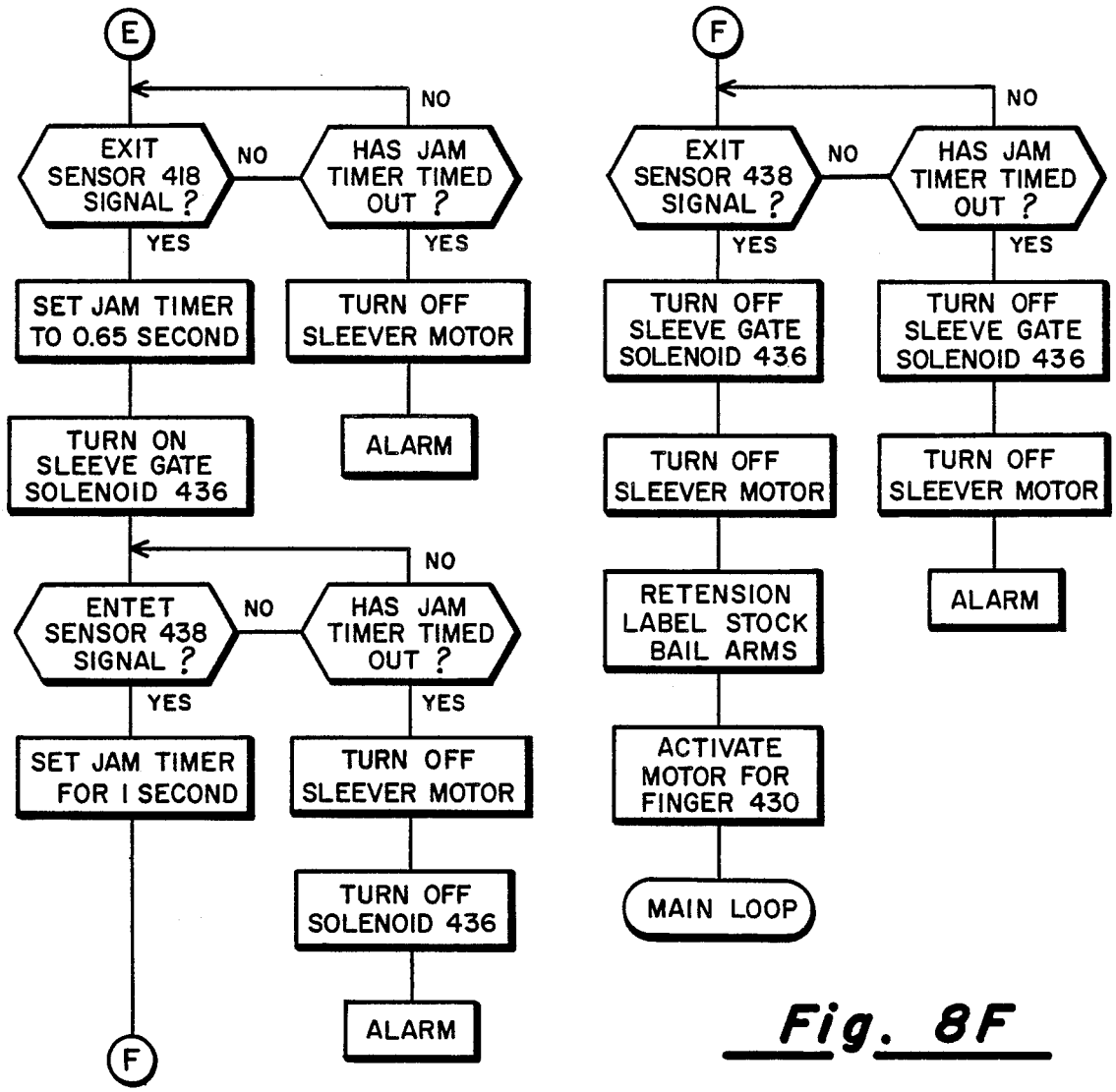

If duplicator 28 has sent a "sleeve disk" command, the sleever motor is turned on, to activate all of the rollers in the sleever/diverter module (FIG. 4A). This activation presumes that the diskette has fallen downwardly onto gate 228, and is ready to enter the sleever module. However, in some instances the diskette may not fall directly down upon gate 228, ad may become partially lodged at an irregular angle without lying flat on gate 228. This condition is dealt with by measuring the amount of time required for the diskette to enter sensor 418. The jam timer is set for a time of one second (FIG. 8C), and if this time period passes without the diskette arriving at sensor 418, reset solenoid 410 is activated for a forty millisecond time interval. The jam timer is again set to one second and the time is measured until the diskette enters sensor 418. If the diskette once again does not enter sensor 418 within the one second time interval an alarm is generated (FIG. 8D).

When the diskette enters the sleever unit a signal from ssensor 418 is generated, which turns off the diskette transport motor 340 and the jam timer is reset for a time of one second. If the diskette has not exited sensor 418 within this one second time interval, the sleever motors are turned off and an appropriate alarm is generated. After the diskette exits sensor 418, a signal is generated which causes the jam timer to be reset to 0.65 seconds, and the sleeve gate solenoid 436 becomes turned on. The sleeved diskette then becomes ejected leftwardly through the sleever unit, and passes into sensor 438. A signal from sensor 438 causes the jam timer to be reset to a time interval of one second, within which time the diskette should leave sensor 438. If this does not occur then the system is again shut down and an appropriate alarm is generated. However, if the diskette passes through sensor 438 the sleeve gate solenoid 436 is turned off, the sleever drive motor is turned off, the labeler supply and take-up reel motors 303 and 321 are activated to retension the label stock (FIG. 3A), the motor which activates finger 430 is engaged to cause finger 430 to retract upwardly and then downwardly into opening contact with the next sleeve (FIG. 4A), and program control is returned to the "main loop" program.

Figure 9A:
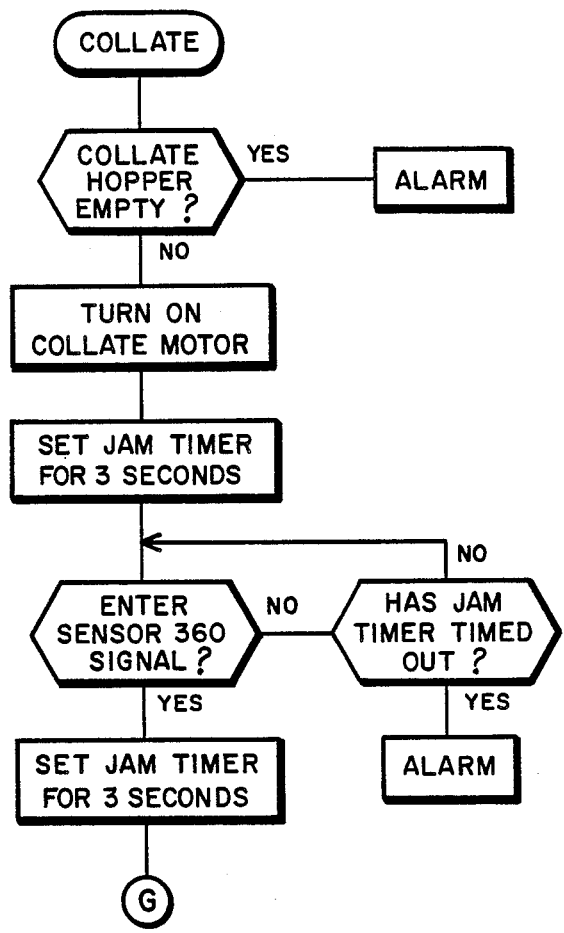
FIGS. 9A-9B show the control processor collate operation.
Figure 9B:
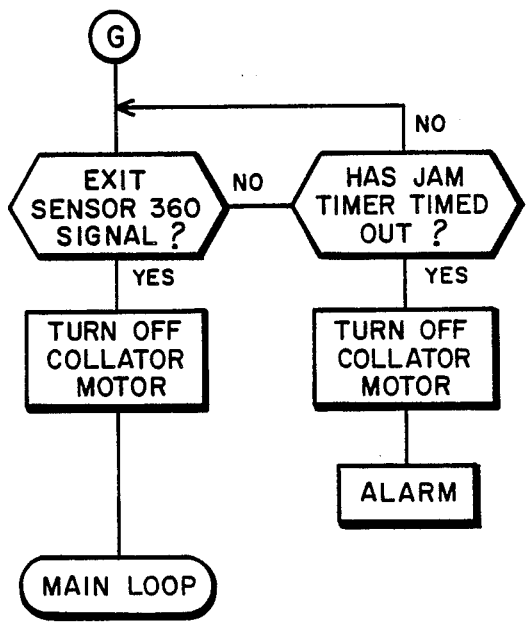

FIGS. 9A and 9B show the operation of the "collate" program, which is executed by control processor 32 to cause a collate card or separator sheet to be ejected into the output bin 20. The "collate" program first examines whether the supply of collator cards is empty, and if so, activates an alarm. If a supply of collator cards exists the collate motor turns on to activate the rollers in the collate module, the jam timer is set for a time interval of three seconds, and a signal from sensor 360 is monitored. When the snsor 360 signal arrives the jam timer is again set for a time period of three seconds, to permit the collator card time to leave sensor 360, and when the exit sensor 360 signal arrives the collator motor is turned off, and control of the program is returned to the "main loop" program. If any of the timed operations do not occur within the preset time intervals, an appropriate alarm is generated.

The present invention may be embodied in other specific forms without departing from the spirit or essential attributes thereof, add it is therefore desired that the present embodiment be considered in all respects as illustrative and not restrictive, reference being made to the appended claims rather than to the foregoing description to indicate the scope of the invention.

WHAT IS CLAIMED IS:

1. A system for automating the processing and packaging of prerecorded diskettes supplied by a magnetic recording duplicator, comprising
   (a) a plurality of segmented conveyors arranged along a path of travel, including a first conveyor segment aligned to receive prerecorded diskettes and arranged proximate a labeler/printer;
   (b) said labeler/printer comprising means for printing labels and further means for applying said labels to a prerecorded diskette conveyed by said first conveyor segment;
   (c) a second conveyor segment arranged to receive prerecorded diskettes from said first conveyor segment;
   (d) means for selectively deflecting prerecorded diskettes from said path of travel, said means being arranged along said second conveyor segment;
   (e) a sleever aligned with said second conveyor segment, said sleever having a bin for holding a supply of open-ended sleeves and having means for placing a sleeve into said path of travel and for opening said sleeve open end to receive a prerecorded diskette into said sleeve;
   (f) means for conveying said prerecorded diskettes and sleeves into an output collection bin; and
   (g) a collator positioned adjacent said output collection bin, said collator having a bin for holding a plurality of separator cards and means for selectively conveying said separator cards into said output collection bin.

2. The apparatus of claim 1, further comprising a control processor connected to said magnetic recording duplicator, said plurality of segmented conveyors, said labeler/printer, said means for selectively deflecting, said sleever and said collator, and having means for receiving signals from said magnetic recording duplicator indicative of identity and status of said prerecorded diskettes, and means for controlling said labeler/printer, and said means for selectively deflecting, and said collator.

3. The apparatus of claim 2, wherein said labeler/printer further comprises a first sensor positioned along said path of travel to detect the presence of prerecorded diskettes ahead of said means for applying said labels, said first sensor being connected to said control processor, and a second sensor positioned along said path of travel after said means for applying said labels, said second sensor being connected to said control processor.

4. The apparatus of claim 3, wherein said labeler/printer further comprises a label supply reel adapted to hold a roll of perforated label backing to which is adhesively applied a plurality of regularly spaced labels, a label backing take-up reel adapted to receive said roll of label backing, and means for guiding said label backing over a label path between said reels; a sprocket and drive motor along said label path wherein said sprocket is engageable with said perforated label backing; a printer positioned along said label path; and a label peeler positioned along said label path after said printer, having means for removing labels from said label backing.

5. The apparatus of claim 4, wherein said label peeler further comprises a blade block having a sharp angle apex in said label path and a rotatable pin at said sharp angle apex, said rotatable pin being positioned closely proximate to said first conveyor segment path of travel.

6. The apparatus of claim 5, wherein said blade block further comprises a bearing edge closely proximate to said rotatable pin, said bearing edge having a bearing surface complementary shaped to said rotatable pin.

7. The apparatus of claim 4, wherein said sprocket and drive motor further comprise a bi-directional stepper motor fixedly coupled to a toothed sprocket.

8. The apparatus of claim 4, further comprising a supply reel motor drivingly coupled to said label supply reel, and a rotatable roller attached to a movable supply reel bail arm, said roller arranged in said label path to guide said label backing, and a first limit switch positioned to be activated by a predetermined position of said supply reel bail arm.

9. The apparatus of claim 8, further comprising a take-up reel motor drivingly coupled to said label backing take-up reel, and a rotatable roller attached to a movable take-up reel bail arm, said roller arranged in said label path to guide said label backing, and a second limit switch positioned to be activated by a predetermined position of said take-up reel bail arm.

10. The apparatus of claim 9, wherein said first and second limit switches are connected to said control processor, and said control processor includes means for activating said supply reel motor and said take-up reel motor.

11. The apparatus of claim 3, wherein said first conveyor segment further comprises a first plurality of rollers arranged adjacent said path of travel, a first drive belt drivingly engaged about each of said first plurality of rollers, and a first drive motor drivingly engaged with said first drive belt.

12. The apparatus of claim 11, wherein said control processor further comprises means for selectively activating said first drive motor.

13. The apparatus of claim 12, wherein said first conveyor segment further comprises a second plurality of rollers arranged adjacent said path of travel and each of said second plurality of rollers being in rolling contact with one of said first plurality of rollers.

14. The apparatus of claim 13, further comprising a second drive motor connected by an endless loop belt in driving engagement with a least several of said second plurality of rollers.

15. The apparatus of claim 14, further comprising means for feeding diskettes along said path of travel between respective ones of said first and second plurality of rollers.

16. The apparatus of claim 15, wherein said control processor further comprises means for selectively activating said second drive motor.

17. Th apparatus of claim 16, wherein said second drive motor further comprises a bi-directional stepper motor.

18. The apparatus of claim 17, wherein said control processor means for selectively activating said second drive motor comprises means responsive to a signal from said first sensor.

19. The apparatus of claim 18, wherein said second drive belt is moved at a higher linear speed than said first drive belt, and said first plurality of rollers may be overdriven by rolling contact with said second plurality of rollers.

20. The apparatus of claim 19, wherein said labeler/printer further comprises a label supply source adapted to hold a supply of perforated label backing to which is adhesively applied a plurality of regularly spaced labels, a label backing take-up reel adapted to receive said supply of label backing, and means for guiding said label backing over a label path between said supply source and take-up reel; a sprocket and drive motor along said label path wherein said sprocket is engageable with said perforated label backing; a printer positioned along said label path; and a label peeler positioned along said label path after said printer, having means for removing labels from said label backing.

21. The apparatus of claim 20, wherein said second drive motor further comprises said sprocket drive motor, through driveable engagement of said second belt with said sprocket.

22. Tee apparatus of claim 21, wherein said control processor further comprises means for reversing the drive direction of said second drive motor.

23. The apparatus of claim 22, wherein said control processor means for reversing the drive direction of said second drive motor comprises means responsive to a signal from said second sensor.

24. The apparatus of claim 23, wherein said control processor further comprises time-setting means for setting the maximum time interval permitted for signals sequentially generated by said first and second sensors, and for generating an alarm signal when the maximum time setting is exceeded.

25. The apparatus of claim 2, wherein said means for selectvely deflecting prerecorded diskettes further comprises a pivotable tray positioned below the output end of said first conveyor segment, in alignment with and forming a part of said second conveyor segment; means for selectivlly pivoting said tray from a horizontal position to an inclined position; and a collection chute in alignment with said tray inclined position.

26. The apparatus of claim 25, wherein said control processor further comprises means for activating said means for pivoting for a redetermined time interval.

27. The apparatus of claim 26, wherein said pivotable tray has a plurality of openings therethrough, and further comprising motor-driven rollers projecting upwardly through said openings in alignment with said second conveyor segment.

28. The apparatus of clam 27, further comprising a third sensor positioned along said path of travel after said pivotable tray, said third sensor being connected to said control processor.

29. The apparatus of claim 2, wherein said sleever means for opening said sleeve open end further comprises a rotatable shaft positioned near said path of travel, and means for selectively rotating said shaft over an angle of rotation less than 360°; a finger affixed to said shaft and configured for insertion into an open end of the topmost of said sleeves when said shaft is at one end of its angular rotation and withdrawing from said open end when said shaft is at the other end of its angular rotation.

30. The apparatus of claim 29, wherein said control processor further comprises means for activating said means for selectively rotating said shaft.

31. The apparatus of claim 30, wherein said sleever further comprises a pivotable gate positioned adjacent said bin, said gate having a first pivot position blocking said pat of travel and a second pivot position unblocking said path of travel, and means for selectively activating said pivotable gate.

32. The apparatus of claim 31, wherein said means for selectively activating said pivotable gate is connected to said control processor.

33. The apparatus of claim 32, wherein said bin further comprises a supply tray pivotally mounted on a slide mechanism, and means for upwardly biasing said supply tray.

34. The apparatus of claim 33, further comprising a fourth sensor positioned in said path of travel adjacent said means for conveying said prerecorded diskettes and sleeves into an output collection bin.

35. The apparatus of claim 34, wherein said fourth sensor is connected to said control processor.

36. The apparatus of claim 2, wherein said collator further comprises an upwardly biased tray adapted for holding a plurality f collator cards; a plurality of rollers positioned above said tray in alignment with said path of travel; and motor means for rotating said rollers.

37. The apparatus of claim 36, wherein said control processor further comprises means for activating said motor means.

38. The apparatus of claim 37, further comprising a fifth sensor positioned in said path of travel adjacent said rollers, said fifth sensor arranged to detect collator cards being ejected from said collator.

39. The apparatus of claim 38, wherein said fifth sensor is connected to said control processor.

40. A method of processing and packaging prerecorded diskettes by a plurality of workstations sequentially distributed along a single path of travel, comprising the steps of
  (a) conveying said diskettes along said path of travel past a first printer/labeler workstation and controlling the conveying speed past said first workstation at a first predetermined rate;
  (b) applying labels at said first workstation by conveying said labels to said diskettes at the same first predetermined rate;
  (c) conveying labeled diskettes along said path of travel to a second sleeving workstation containing a supply of open-eneed sleeves, including a sleeve interposed into said path of travel;
  (d) inserting said labeled diskettes into said sleeves;
  (e) conveying sleeved, labeled diskettes into an output collection bin by vertically stacking; and
  (f) selectively conveying separator cards from a third collator workstation positioned adjacent said output collection bin into predetermined vertical stacking positions in said output collection bin.

41. The method of claim 40, further comprising the intermediate step, between step b) and c), of selectively deflecting predetermined diskettes from said path of travel.

42. The method of claim 41, further comprising in step c), the further step of permitting a predetermined time to lapse for the completion of the intermediate step, and if the intermediate step is not completed with the predetermined time, to discontinue the performance of subsequent steps.

43. The method of claim 42, further comprising in step c), the further step of permitting a predetermined time to lapse for the completion of step (c), and if the step is not completed within the predetermined time, to discontinue the performance of subsequent steps.

44. The method of claim 43, further comprising in step (d), the further step of permitting a predetermined time to lapse for the completion of step (d), and if the step is not completed within the predetermined time, to discontinue the performance of subsequent steps.

* * * * *

UNITED STATES PATENT AND TRADEMARK OFFICE
CERTIFICATE OF CORRECTION

PATENT NO. : 4,910,675

DATED : March 20, 1990

INVENTOR(S) : David C. Burns, et al

It is certified that error appears in the above-identified patent and that said Letters Patent is hereby corrected as shown below:

On the title page, item [57]:

In the Abstract, line 5, "inserting collator" should be -- inserting a diskette into an outer sleeve, and a collator for inserting collator --.

In column 4, line 36, "5501" should be -- 501 --; line 41, "o the" should be -- of the --.

In column 5, line 54, "Dlrin" should be -- Delrin --; line 61, "neede" should be -- needle --.

In column 6, line 5, "oller 335" should be -- roller 335 --.

In column 8, line 22, "propositioned" should be -- prepositioned --.

In column 9, line 2, "sleeve module" should be -- sleever module --; line 40, "vertical." should be -- vertically. --; line 65, "lowerposition" should be -- lower position --.

In column 10, line 52, "railing edge" should be -- trailing edge --.

In column 11, line 56, "sleved," should be -- sleeved, --.

In column 13, line 31, "i generated" should be -- is generated --; line 47, "ad may" should be -- and may --; line 60 "ssensor" should be -- sensor --.

UNITED STATES PATENT AND TRADEMARK OFFICE
CERTIFICATE OF CORRECTION

PATENT NO. : 4,910,675

DATED : March 20, 1990

INVENTOR(S) : David C. Burns, et al

It is certified that error appears in the above-identified patent and that said Letters Patent is hereby corrected as shown below:

In column 14, line 25, "snsor 360" should be -- sensor 360 --; line 35, "add" should be -- and --.
In claim 22, column 16, line 52, "Tee" should be -- The --.
In claim 25, column 16, line 66, "selectvely" should be -- selectively --.
In claim 31, column 17, line 35, "pat" should be -- path --.
In claim 36, column 17, line 54, "plurality f" should be -- plurality of --.

Signed and Sealed this

Seventeenth Day of September, 1991

*Attest:*

HARRY F. MANBECK, JR.

*Attesting Officer*  *Commissioner of Patents and Trademarks*